(12) United States Patent
Kuhnen et al.

(10) Patent No.: US 9,399,387 B2
(45) Date of Patent: Jul. 26, 2016

(54) DEVICE FOR ELECTRICALLY CONTACTING AN ELECTRICALLY ACTIVATABLE FUNCTIONAL LAYER OF A VEHICLE WINDOWPANE THAT IS ADJUSTABLE BY A WINDOWPANE DRIVER

(71) Applicant: BROSE FAHRZEUGTEILE GMBH & CO. Kommanditgesellschaft, Hallstadt, Hallstadt (DE)

(72) Inventors: Thorsten Kuhnen, Litzendorf (DE); Jan Kaiser, Bayreuth (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 186 days.

(21) Appl. No.: 14/194,973

(22) Filed: Mar. 3, 2014

(65) Prior Publication Data

US 2014/0247473 A1 Sep. 4, 2014

(30) Foreign Application Priority Data

Mar. 2, 2013 (DE) .......................... 10 2013 003 533

(51) Int. Cl.
*B60J 3/04* (2006.01)
*B60J 1/17* (2006.01)
*B60J 10/04* (2006.01)
*E05F 11/38* (2006.01)

(52) U.S. Cl.
CPC .... *B60J 3/04* (2013.01); *B60J 1/17* (2013.01); *B60J 10/04* (2013.01); *E05F 11/385* (2013.01)

(58) Field of Classification Search
CPC ............... B60J 3/04; B60J 1/17; B60J 10/04; E05F 11/385; C09K 9/02; B60R 1/088; H04N 9/3137; H04N 9/22; G02F 1/155; G02F 1/1523; G02F 1/1525; G02F 1/1521; G02F 1/1533; G02F 1/03; G02F 1/0316; G02F 3/16; G02F 1/163
USPC ................. 359/290, 277, 245–247, 254, 242; 345/49, 105; 438/929
See application file for complete search history.

(56) References Cited

U.S. PATENT DOCUMENTS

| | | | | |
|---|---|---|---|---|
| 3,860,943 A | * | 1/1975 | Tague | ..................... G02F 1/172 359/245 |
| 7,535,614 B1 | * | 5/2009 | Tapley | ........................ B60J 3/04 345/105 |
| 7,649,668 B2 | | 1/2010 | Fanton et al. | |
| 2013/0050797 A1 | | 2/2013 | Takahashi et al. | |

FOREIGN PATENT DOCUMENTS

| | | |
|---|---|---|
| CN | 1938642 A | 3/2007 |
| JP | 2009006741 A | 1/2009 |
| KR | 20040073212 A | 8/2004 |
| KR | 20120117256 A | 10/2012 |

* cited by examiner

*Primary Examiner* — Scott J Sugarman
*Assistant Examiner* — Kristina Deherrera
(74) *Attorney, Agent, or Firm* — Laurence A. Greenberg; Werner H. Stemer; Ralph E. Locher

(57) ABSTRACT

A device electrically contacts an electrically activatable functional layer of a vehicle windowpane that is adjustable by a windowpane driver. The device has the windowpane driver with at least two first contact elements for the transmission of control signals to the functional layer. In an as-intended installed state, the first contact elements are in electrical contact directly with at least two corresponding first contact points of the functional layer or of a windowpane holder directly securing the vehicle windowpane.

14 Claims, 3 Drawing Sheets

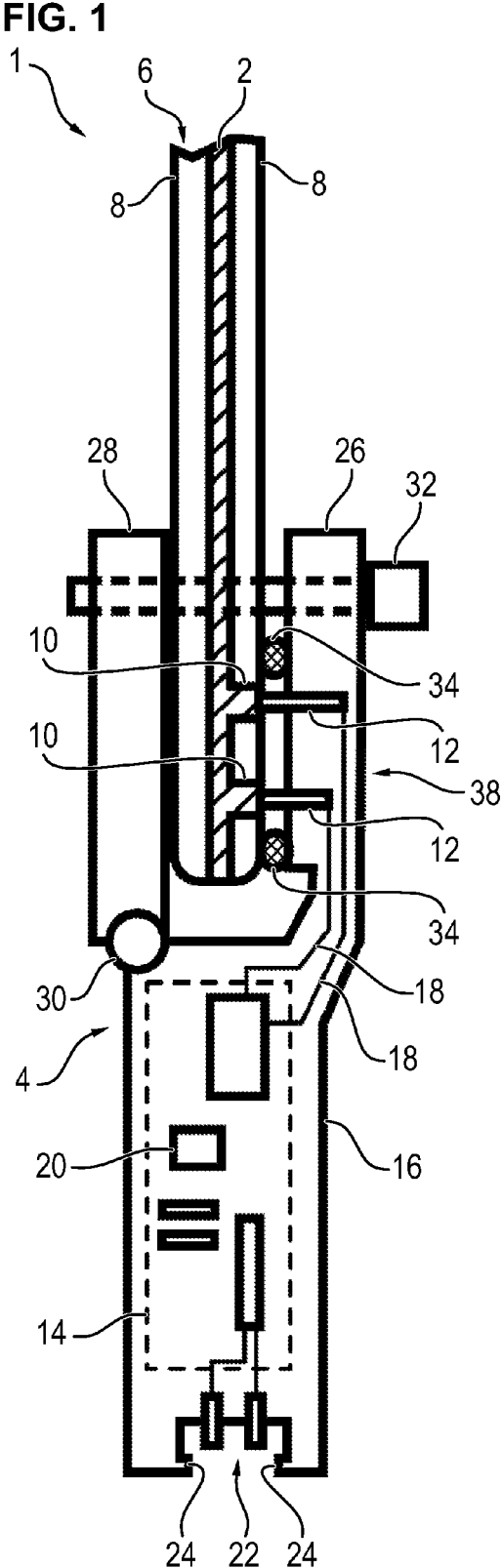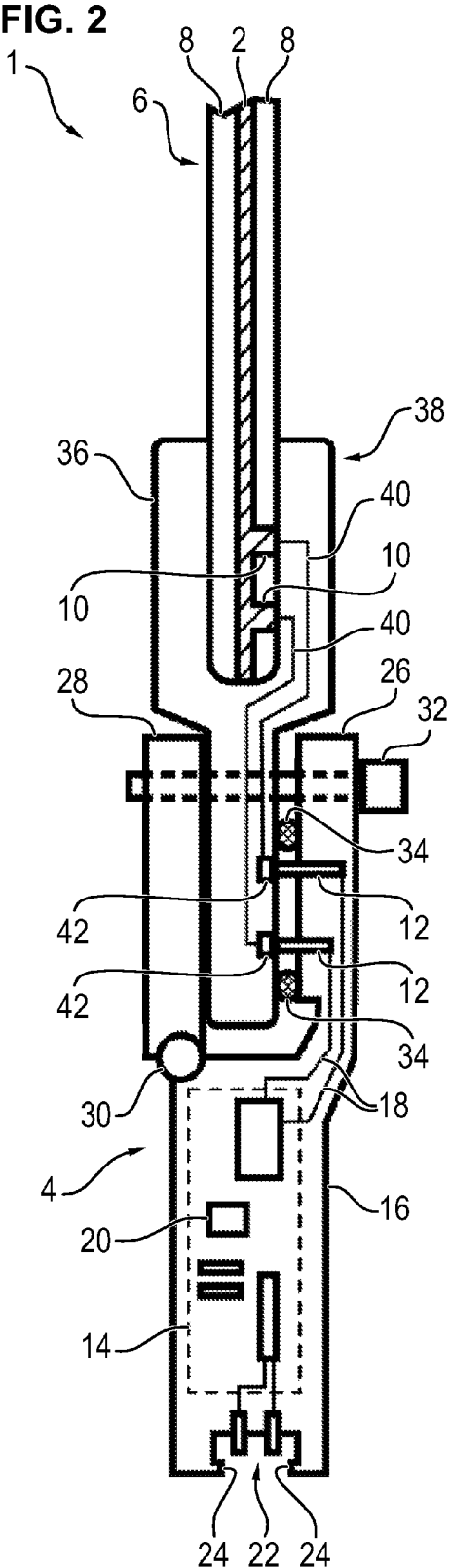

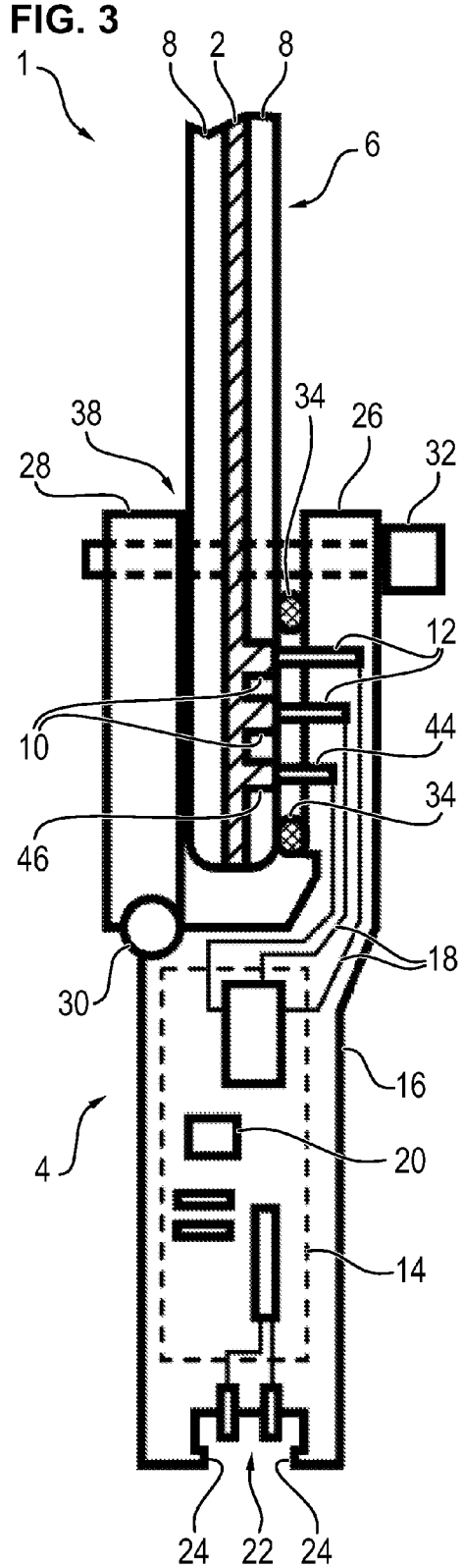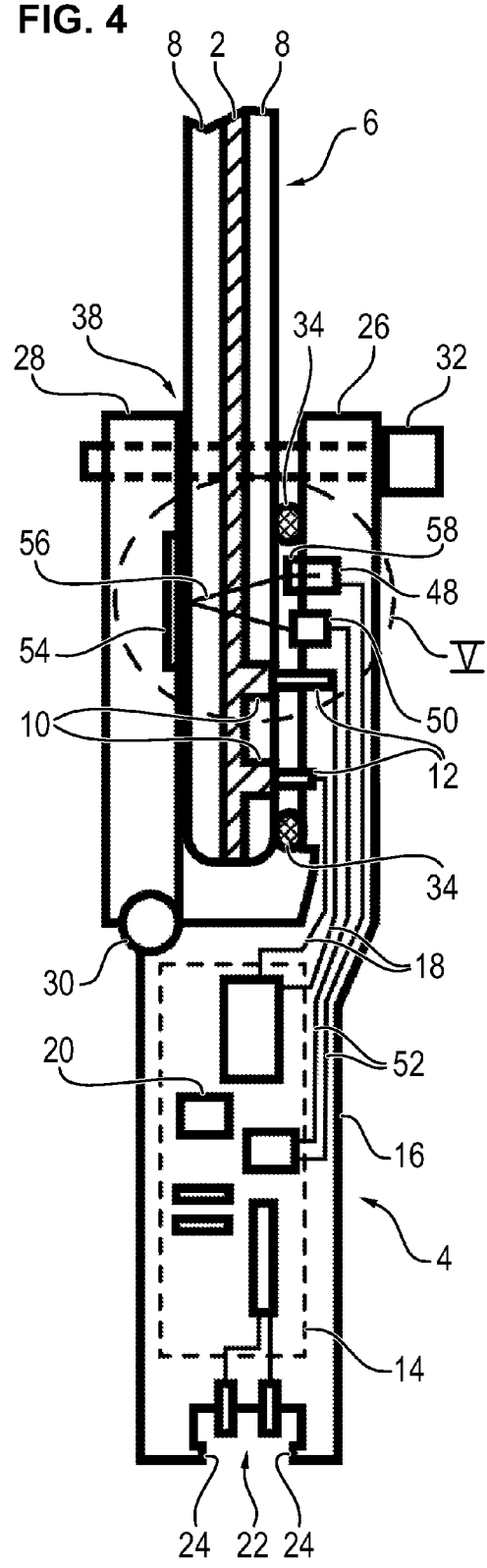

DEVICE FOR ELECTRICALLY CONTACTING AN ELECTRICALLY ACTIVATABLE FUNCTIONAL LAYER OF A VEHICLE WINDOWPANE THAT IS ADJUSTABLE BY A WINDOWPANE DRIVER

CROSS-REFERENCE TO RELATED APPLICATION

This application claims the priority, under 35 U.S.C. §119, of German application DE 10 2013 003 533.3, filed Mar. 2, 2013; the prior application is herewith incorporated by reference in its entirety.

BACKGROUND OF THE INVENTION

Field of the Invention

The invention relates to a device for electrically contacting a vehicle windowpane of a vehicle, wherein the vehicle windowpane is adjustable by a windowpane driver and has an electrically activatable functional layer, in particular an electro transparent layer.

In order to attenuate sunlight that enters an interior space (for example the interior of a motor vehicle or of a building) from outside through one or more windows, tinted windowpanes are often used. Such windowpanes, which are produced, for example, by adding color particles to the glass of the windowpane or by coating, always have the same tint. This is disadvantageous when used on a motor vehicle in particular, especially since these windowpanes restrict the view through the respective windowpane to an unnecessary extent when there is little brightness, for example when there is extensive cloud cover or at night-time. Therefore, at least in the field of view of the driver, such tinted windowpanes generally cannot be used for safety reasons.

In the meantime, materials of which the light absorption varies in dependence on an electrical field have been developed. By use of these materials, (laminated) windowpanes that are variable in their transparency can be produced. For the activation of such windowpanes, referred to as electro transparent, they must be coupled to an energy source and/or a control device for the transmission of the control signals, for example in order to be able to apply the electrical field. In particular in the case of adjustable windowpanes of a vehicle, for example the side windowpanes or the sliding roof, the connection between the windowpane and the energy source or control device for signal transmitting purposes entails a degree of complexity in terms of the structural design and technical aspects of assembly. The reasons for that are on the one hand that this connection lies within the outer structure of the vehicle, but outside a liquid-impermeable separation of the vehicle interior from the so-called wet area, and on the other hand that the often required feed lines have to be moved along with the windowpane.

SUMMARY OF THE INVENTION

The invention is based on the object of allowing easy contacting of an electrically activatable functional layer of a vehicle windowpane that is adjustable by a windowpane driver.

The device according to the invention serves for the electrical contacting of an electrically activatable functional layer of a (vehicle) windowpane that is adjustable by a windowpane driver. According to the invention, the windowpane driver is assigned to the device and contains at least two first contact elements, which are intended for the transmission of control signals to the functional layer. In the as-intended installed state, the first contact elements are in electrical contact directly with at least two corresponding first contact points, wherein the two first contact points are assigned either directly to the functional layer or alternatively to a windowpane holder directly securing the windowpane.

Such a windowpane holder is preferably an adapter, which is rigidly connected to the windowpane in particular at the manufacturers. In the as-intended installed state of the windowpane in the vehicle, the windowpane driver acts on the windowpane holder for the adjustment of the windowpane. The functional layer is preferably in electrical contact with this windowpane holder, so that, in the as-intended installed state, the first two contact elements of the windowpane driver are in contact with the functional layer of the windowpane by way of the corresponding first contact points of the windowpane holder.

The functional layer of the windowpane is preferably a layer which is adjustable in its transparency, which is to say in its attenuation of the transmitted light, by an electrical control signal. Such layers (referred to hereinafter as electro transparent) are formed, for example, by electrochromic material, such as for example tungsten oxide, or are configured as a so-called suspended particle device (SPD) layer. By laminating such an electro transparent layer between two layers of glass in a sandwich-like manner, a windowpane referred to as electro transparent is formed. Such electro transparent windowpanes offer the advantage that they are adjustable in their attenuation, i.e. (color) tinting, over a comparatively wide range, and that they take up almost the same installation space as conventional windowpanes. Moreover, electro transparent windowpanes remain transparent even in the possible case of high attenuation, so that—by contrast with a roller blind or the like—an occupant of the vehicle has an unhindered view of the surroundings of the vehicle.

The integration of the contact elements in the windowpane driver has the advantage here that the contacting of the functional layer can take place without any great complexity in terms of assembly, and consequently is particularly easy.

In a preferred configuration, the device for contacting the functional layer has control electronics, which are intended for the activation of the functional layer. These control electronics are in particular integrated in the windowpane driver. The windowpane driver is preferably formed here with the integrated control electronics as a so-called injection-molded lead frame (known as a molded interconnect device or MID for short). In other words, the interconnects required for the control electronics are produced integrally with the windowpane driver, in particular in a portion of the windowpane driver forming a housing. Circuit assemblies, such as for example resistors, microprocessors, etc., are in this case often connected to interconnects of the windowpane driver by a soldering process. The configuration of the windowpane driver as an MID achieves the effect of a particularly compact type of construction.

In an advantageous configuration, in the as-intended installed state, the control electronics are arranged as an extension of the windowpane. In other words, the control electronics lie approximately in the plane of the windowpane. These results in a particularly flat and therefore space-saving type of construction of the windowpane and the windowpane driver attached thereto.

In an expedient configuration, the control electronics contain a voltage transformer, which is intended for the conversion of the voltage made available by an electrical system of the vehicle, in particular the battery of the vehicle, into a control voltage. The voltage transformer is, in particular, a so-called step-up transformer or step-up converter, which is configured for converting the 12V direct voltage that is often made available by the battery to, for example, a 120V direct voltage. The integration of the voltage transformer in the windowpane driver also obviates the need for additional assembly effort for example brought about by fitting and contacting a separate voltage transformer in the vicinity of the windowpane.

In a further advantageous configuration, a device for measuring the transparency of the windowpane is integrated in the windowpane driver. The device for measuring the transparency is in particular integrated in the control electronics or in contact with them. The device for measuring the transparency makes it easily possible for the transparency of the windowpane to be regulated by the control electronics.

In a preferred configuration, the device for measuring the transparency contains a light-emitting element and a light-sensitive receiver. It is possible here within the scope of the invention that the light-emitting element and the light-sensitive receiver are arranged on the windowpane driver on one side each of the windowpane. Preferably, however, the light-emitting element and the receiver are arranged on the windowpane driver on the same side of the windowpane. In the latter case, arranged on the opposite side of the windowpane is a reflective layer, which reflects the light emitted from the light emitting element through the windowpane onto the light-sensitive receiver. The light-emitting element is, for example, an LED. Alternatively, the light-emitting element is formed by a diode laser. The beam thereof is passed, for example, by way of a diffractive optical element (DOE for short) in such a way that the light-sensitive receiver, preferably a phototransistor, is exposed to light. The DOE is, for example, a nanostructure film of plastic, which deflects the beam by diffraction effects.

In order to be able to check the contacting of the two first contact elements with the two first contact points, in a further embodiment at least one second contact element is arranged on the windowpane driver. In the as intended installed state, the second contact element is in electrical contact directly with at least one corresponding second contact point of the functional layer or of the windowpane holder directly securing the windowpane. In particular, the second contact element is intended for the purpose of forming in the as-intended installed state a voltage divider with the two first contact elements and the respectively corresponding contact points of the functional layer or of the windowpane holder. By the voltage divider, the functioning of the contacting can be advantageously checked and/or the aging of the contacting can be monitored.

In a further expedient configuration, the first contact elements and, if applicable, the second contact element is recessed in the windowpane driver, i.e. are set back from an enveloping surface enclosing the windowpane driver. The contact elements are secured here on the windowpane driver in such a way that, in the as-intended installed state, they project from the windowpane driver, i.e. protrude beyond the enveloping surface, under the effect of an assembly force, so that the contacting with the corresponding first or second contact points can take place. The assembly force is caused, for example, by screwing of the windowpane driver to the windowpane or the windowpane holder. Alternatively, within the scope of the invention, the assembly force may also be applied by a clip connection between the windowpane driver and the windowpane or the windowpane holder. For example, the first contact elements and, if applicable, the second contact element are embedded in an elastomer, which is compressed during the assembly of the windowpane driver on account of the assembly force, so that the contact elements project from the windowpane driver.

In a preferred configuration, the windowpane driver has a seal, which surrounds in particular the first contact elements and, if applicable, the second contact element, so that they are isolated in a liquid-impermeable manner from the surroundings in the as-intended installed state. The seal is expediently formed by the elastomer in which the contact elements are embedded. The elastomer is compressed during the assembly, so that on the one hand the contact elements project from the windowpane driver and so that on the other hand a pressing force required for an effective sealing effect is brought about between the windowpane and the elastomer.

It is conceivable within the scope of the invention that the contact points corresponding to the contact elements are recessed in the windowpane or in the windowpane holder, so that the contact elements "dig into" the windowpane or the windowpane holder. For this purpose, the recessed contact points are, for example, configured in a funnel-shaped manner. This easily achieves the effect that, during assembly, the contact elements are forcibly guided by the funnel shaped depression, and blind assembly, i.e. "self locating" contacting, is possible.

The first contact elements and, if applicable, the second contact element are formed, for example, as contact pins or are produced by a stamped grid. The first contact points or the second contact point is/are preferably in each case a contact area on which the respective contact element is located. Alternatively, within the scope of the invention in particular in the case of a sandwich-like structure of the windowpane the contact points may also be arranged at the periphery of the windowpane or at the periphery of the windowpane with the functional layer.

However, it is also conceivable in principle within the scope of the invention that the circuit of the first contact elements is coupled capacitively, i.e. without galvanic contact, to the functional layer by way of the first contact elements. An inductive coupling of the functional layer to the first contact elements is also likewise conceivable within the scope of the invention.

For the connection of the control electronics and/or the first contact elements and, if applicable, the second contact element to the electrical system of the vehicle or to the battery, the windowpane driver expediently has a plug-in connection, at which an electrical feed line of the electrical system of the vehicle or of the battery can be connected. It is conceivable here within the scope of the invention that, for example, locking lugs, which, in the as-intended assembled state, lock with the electrical feed line, are arranged on the plug-in connection, so that tension relief of the electrical feed line on the windowpane driver is easily made possible.

Other features which are considered as characteristic for the invention are set forth in the appended claims.

Although the invention is illustrated and described herein as embodied in a device for electrically contacting an electrically activatable functional layer of a vehicle windowpane that is adjustable by means of a windowpane driver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 1-4 are diagrammatic, side views showing alternative exemplary embodiments of a device for contacting an electrically activatable functional layer of a vehicle windowpane according to the invention.

DETAILED DESCRIPTION OF THE INVENTION

Figure 5:
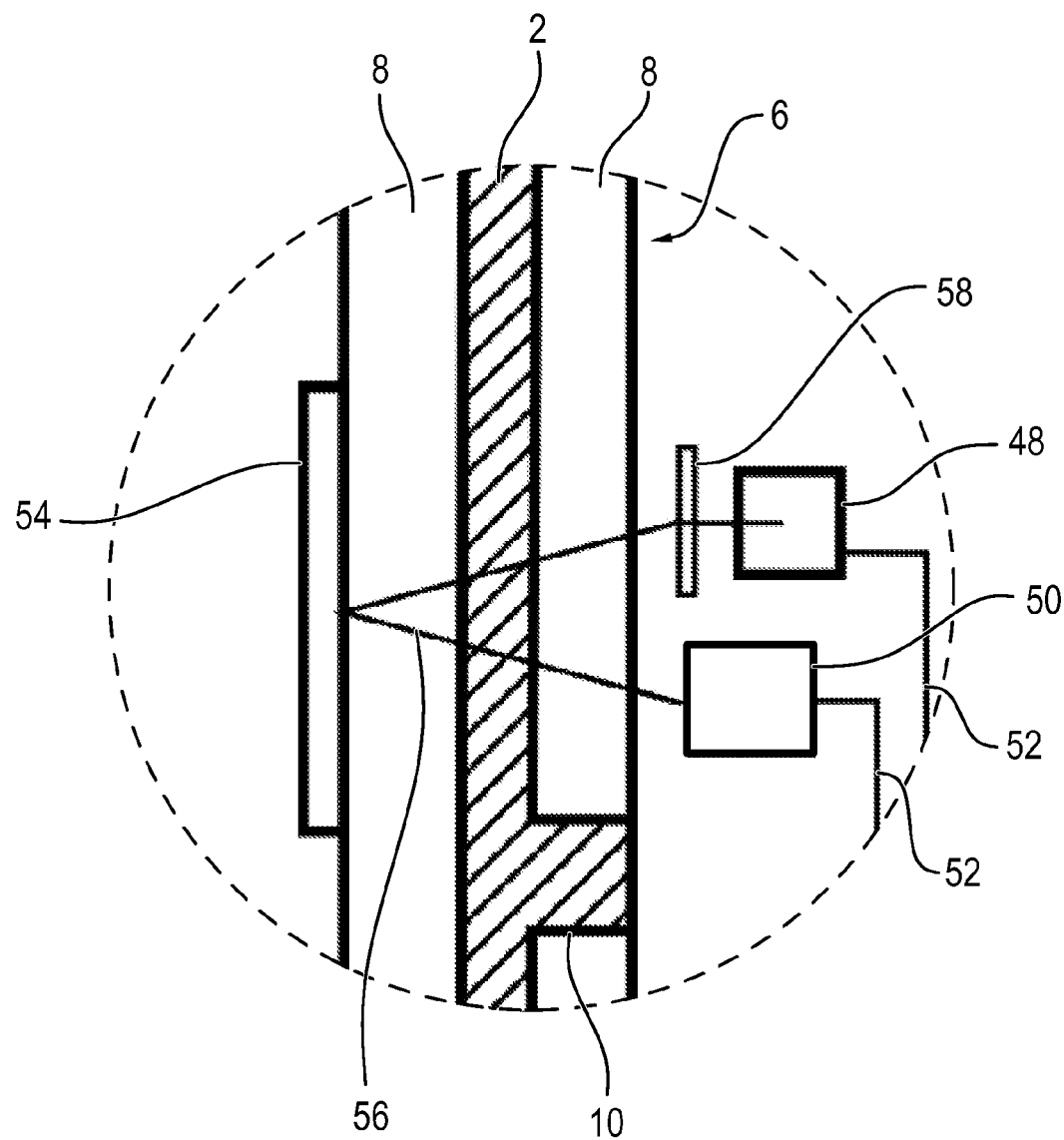
FIG. 5 is an enlarged, side view of detail V of the device shown in FIG. 4.

Parts that correspond to one another are always provided with the same designations in all of the figures. Referring now to the figures of the drawings in detail and first, particularly to FIG. 1 thereof, there is shown a device 1 for the electrical contacting of an electrically activatable functional layer 2 of a (vehicle) windowpane 6 that is adjustable by means of a windowpane driver 4 is represented. The windowpane 6 is formed by two layers of glass 8, which are laminated onto the functional layer 2 in a sandwich-like manner. The windowpane 6 also has two contact points 10, by which the functional layer 2 is in contact with the device 1. The functional layer 2 is an electro chromic tungsten-oxide layer or a so-called SPD layer. In both cases, the transparency of the functional layer 2 can be varied by applying an electrical field.

The windowpane driver 4 is assigned to the device 1 and has for the contacting of the two contact points 10 two contact elements configured as contact pins 12, which are arranged on the windowpane driver 4 in such a way that, in an as-intended installed state that is represented in FIG. 1, they are in electrical contact with the contact points 10. The windowpane driver 4 also contains control electronics 14 for the activation of the functional layer 2. The control electronics 14 are arranged here as an extension of the windowpane 6, in a portion of the windowpane driver 4 that forms a housing 16. The control electronics 14 and contact lines 18, which connect the contact pins 12 to the control electronics 14, are, for example, produced integrally with the windowpane driver 4 by the MID technique.

The control electronics 14 contain a voltage transformer 20, by which an input voltage made available by a voltage source (for example the vehicle battery) is converted to a signal output voltage required for the activation of the functional layer 2. For the connection of the control electronics 14 to the voltage source, the windowpane driver 4 contains in the region of the housing 16 a plug-in connection 22, at which an electrical feed line can be connected. The plug-in connection 22 has for this purpose two locking lugs 24, by which a plug of the electrical feed line can be connected to the windowpane driver 4 captively and relieved of tensile forces.

In the installed state represented, the windowpane driver 4 reaches around the windowpane 6 from two opposite sides of the windowpane 6. For this purpose, the windowpane driver 4 is configured in a y-shaped manner, a first y arm 26 being rigidly connected to the housing 16. A second y arm 28 is movably connected to the housing 16 by way of a hinge 30 and, during the assembly of the windowpane holder 4, is pressed against the rigid y arm 26 by a screw 32 through the windowpane 6. As a result, the windowpane 6 is rigidly connected to the windowpane driver 4.

The windowpane driver 4 also contains a seal 34, which is arranged around the contact pins 12. During the assembly of the windowpane driver 4, the seal 34 is pressed together on account of the assembly force of the screw 32, so that the contact pins 12 come into contact with the contact points 10 as intended. By contrast, in the non-installed state, the seal 34 is relieved to such an extent that the contact pins 12 do not project beyond an enveloping surface defined by the seal 34.

In the exemplary embodiment according to FIG. 2, the windowpane driver 4 acts against a windowpane holder 36 in the assembled state represented. The windowpane holder 36 is likewise configured in a y-shaped manner and completely encloses the windowpane 6 at its lower end 38. The windowpane holder 36 is adhesively bonded to the windowpane 6 for the rigid connection. Integrated in the windowpane holder 36 are two connecting lines 40, which connect the two contact points 10 of the windowpane 6 to two connecting points 42 in an electrically conducting manner. The connecting points 42 are in this case arranged on the windowpane holder 36 in such a way that, in the installed state represented in FIG. 2, the contact pins 12 of the windowpane holder 4 are in contact with the connecting points 42. The connecting points 42 consequently respectively form a contact point by way of which the contact pins 12 are indirectly in electrical contact with the contact points 10. The windowpane driver 4 is configured here identically to the exemplary embodiment represented in FIG. 1.

In the further exemplary embodiment according to FIG. 3, the windowpane driver 4 contains an additional (second) contact pin 44, which, in the as-intended installed state represented, is in contact with an additional (second) contact point 46 of the functional layer 2. By way of the second contact pin 44 and the second contact point 46, in the control unit 14 there is formed a voltage-divider circuit, by which the contacting of the first contact pins 12 with the first contact points 10 can be checked and monitored during operation.

In an alternative exemplary embodiment, represented in FIG. 4 and FIG. 5, arranged in the windowpane driver 4 are a diode laser 48, which serves as a light-emitting element, and a phototransistor 50, which serves as a light-sensitive receiver. The diode laser 48 and the phototransistor 50 are connected to the control unit 14 in each case by way of a line 52. The control unit 14 is configured for measuring the transparency of the windowpane 6 by the diode laser 48 and the phototransistor 50, so that the activation of the functional layer 2 can take place in dependence on the transparency of the windowpane 6.

As can be seen in FIG. 5, the diode laser 48 and the phototransistor 50 are arranged on the same side of the windowpane 6, in the rigid y arm 26 of the windowpane driver 4. Arranged on the opposite side of the windowpane 6 is a reflective layer 54, by which the light beam 56 emitted from the diode laser 48 is reflected onto the phototransistor 50. The reflective layer 54 is arranged here on the movable y arm 28 of the windowpane driver 4. Alternatively, however, the reflective layer may also be fixed directly to the windowpane 6.

Since the light beam 56 of the diode laser 48 is a coherent light beam, a diffractive optical element (DOE) 58 is arranged ahead of the diode laser 48. By the DOE 58, the light beam 56 is directed onto the reflective layer 54 in such a way that the light beam 56 is reflected by way of the reflective layer 54 onto a light-sensitive sensor area of the phototransistor 50.

The subject matter of the invention is not restricted to the exemplary embodiments described above. Rather, further embodiments of the invention may be derived from the foregoing description by a person skilled in the art. In particular, the individual features of the invention that are described on the basis of the various exemplary embodiments and the design variants thereof can also be combined in some other way with one another.

The invention claimed is:

1. A device for electrically contacting an electrically activatable functional layer of a vehicle windowpane, the device comprising:
    a windowpane driver for adjusting the vehicle windowpane, said windowpane driver having at least two first contact elements for a transmission of control signals to the functional layer, wherein, in an as-intended installed state, said two first contact elements are in electrical contact directly with at least two corresponding first contact points of the functional layer or of a windowpane holder directly securing the vehicle windowpane;
    said windowpane driver having at least one second contact element for checking a contacting of said two first contact elements with the first contact points; and
    said second contact element, in the as-intended installed state, being in electrical contact directly with at least one corresponding second contact point of the functional layer or of the windowpane holder directly securing the vehicle windowpane.

2. The device according to claim 1, further comprising control electronics integrated in said windowpane driver.

3. The device according to claim 2, wherein in the as-intended installed state, said control electronics are disposed as an extension of the vehicle windowpane.

4. The device according to claim 2, wherein said control electronics contain a voltage transformer for a conversion of a voltage made available by an electrical system of a vehicle into a control voltage.

5. The device according to claim 1, wherein said windowpane driver has a device for measuring a transparency of the vehicle windowpane.

6. The device according to claim 5, wherein said device for measuring the transparency contains a light-emitting element and a light-sensitive receiver.

7. The device according to claim 1, wherein said two first contact elements are recessed in said windowpane driver and, in the as-intended installed state, project from said windowpane driver under an effect of an assembly force.

8. The device according to claim 1, wherein said windowpane driver has a seal, by which said two first contact elements are isolated in a liquid-impermeable manner from surroundings in the as-intended installed state.

9. The device according to claim 1, further comprising control electronics integrated in said windowpane driver, wherein said windowpane driver has a plug-in connection, at which an electrical feed line to said two first contact elements and/or said control electronics can be connected.

10. The device according to claim 1, wherein said two first contact elements and said second contact element are recessed in said windowpane driver and, in the as-intended installed state, project from said windowpane driver under an effect of an assembly force.

11. The device according to claim 1, wherein said windowpane driver has a seal, by which said two first contact elements and said second contact element are isolated in a liquid-impermeable manner from surroundings in the as-intended installed state.

12. The device according to claim 1, wherein said windowpane driver has a plug-in connection, at which an electrical feed line to said two first contact elements, said second contact element and/or said control electronics can be connected.

13. The device according to claim 1, further comprising control electronics integrated in said windowpane driver, wherein said control electronics contain a voltage transformer for a conversion of a voltage made available by an electrical system of a vehicle into a control voltage and wherein said voltage transformer is a step-up transformer.

14. The device according to claim 1, wherein said second contact element and said second contact point form a voltage divider.

* * * * *